United States Patent [19]

Masuda

[11] 4,371,233
[45] Feb. 1, 1983

[54] LENS-APPLIED OPTICAL FIBER CONNECTOR

[75] Inventor: Sigefumi Masuda, Yokohama, Japan

[73] Assignee: Fujitsu Limited, Kawasaki, Japan

[21] Appl. No.: 162,875

[22] Filed: Jun. 25, 1980

[30] Foreign Application Priority Data

| Jul. 11, 1979 | [JP] | Japan | 54-94498[U] |
| Aug. 28, 1979 | [JP] | Japan | 54-108576 |
| Dec. 13, 1979 | [JP] | Japan | 54-160748[U] |
| Dec. 27, 1979 | [JP] | Japan | 54-182197 |
| Dec. 28, 1979 | [JP] | Japan | 54-170982 |

[51] Int. Cl.³ .............................................. G02B 7/26
[52] U.S. Cl. ............................... 350/96.18; 350/96.21
[58] Field of Search ............... 350/96.18, 96.20, 96.21, 350/96.22

[56] References Cited

U.S. PATENT DOCUMENTS

| 3,950,075 | 4/1976 | Cook et al. | 350/96.22 |
| 4,190,316 | 2/1980 | Malsby et al. | 350/96.18 |
| 4,265,511 | 5/1981 | Nicia et al. | 350/96.18 |
| 4,304,461 | 12/1981 | Stewart et al. | 350/96.18 |
| 4,327,963 | 5/1982 | Khoe et al. | 350/96.18 |

FOREIGN PATENT DOCUMENTS

2002136  2/1979  United Kingdom ............. 350/96.18

OTHER PUBLICATIONS

Nicia, "Practical Low-Loss Lens Connector for Optical Fibres", *Electr. Lett.*, vol. 14, No. 16, Aug. 1978, pp. 511–512.

*Primary Examiner*—John D. Lee
*Attorney, Agent, or Firm*—Staas & Halsey

[57] ABSTRACT

A lens-applied optical fiber connector is used to connect optical fibers for optical communication. The lens-applied optical fiber connector is structured so that the optical fiber connectors are inserted into a lens-applied sleeve and the sleeve is inserted into an adapter. In the present invention, the focal length of the lens is selected to be 0.09 to 0.27 mm and the lens is positioned at the point on the optical axis of the optical fiber apart from the end surface of the fiber as far as the focal length.

13 Claims, 10 Drawing Figures

LENS-APPLIED OPTICAL FIBER CONNECTOR

BACKGROUND OF THE INVENTION

This invention relates to a lens-applied optical fiber connector, and particularly to an optical fiber connector which is suitable for single mode fibers.

Various kinds of optical connectors for connecting optical fibers have been developed and these can be roughly classified into the direct connecting type in which the optical fibers are arranged directly face to face and the lens-applied type using optical lenses.

The direct connecting type is structured so that the ends of optical fibers are inserted into a sleeve and this sleeve is further inserted into an adapter, so that the optical fibers are arranged face to face. In such a structure, it is essential to make the deflection of the optical axis of the face to face optical fibers small in order to make the connecting losses small. For this purpose, the clearance between the sleeve and adapter should be small, the outer diameter of the sleeve should be formed with high accuracy, an optical fiber insertion hole to be provided in the sleeve should be formed on the center axis of the sleeve and the clearance between the hole and the optical fiber should be small.

In particular, for the single mode fiber, the tolerance of the external diameter of the sleeve should be within 0.5 $\mu$m, displacement of the hole should be within 0.9 $\mu$m and the play between the hole and the fiber should be within 0.5 $\mu$m, but in practice the deflection of the optical axis of the optical fiber must be within 1 $\mu$m when all of these factors are taken into consideration. Thus, experiments are conducted for this purpose.

For example, three cylinders of different diameter having a hole at the deflected position are combined in order to set the optical fiber at the center of the sleeve, and these cylinders are rotated independently. Then, a ball bearing is provided at the adapter in order to make the clearance between the sleeve and adapter small. In this manner the sleeve is inserted tightly.

In another example, a split sleeve is provided within the adapter and the sleeve is inserted tightly.

In these structures, the sleeve is inserted tightly with a large inserting or removing force in order to make the clearance between the adapter and sleeve small.

Moreover, such a press-in apparatus results in the wear of the sleeve and adapter and since the clearance between fibers is as small as 1 to 2 $\mu$m, friction powder adheres to the end surface of the optical fibers, resulting in a connecting loss.

In addition, the structure for positioning an optical fiber at the sleeve center is complicated and requires a long period of time for adjustment. With such a background, a lens-applied optical fiber connector utilizing a couple of lenses between the optical fibers has been proposed.

In the lens-applied connector, the lenses and optical fibers are arranged in such a way that the distance between the lens and optical fiber surface becomes equal to the focal distance of the lens. As a result, the light beam emitted from one optical fiber is diverged in parallel by the lens and then converged again by the other lens and focused at the end surface of the other optical fiber. In such a lens-applied connector, the required accuracy for deflection due to divergence of light is alleviated to some extent.

Therefore, the press-in of the sleeve into the adapter which is done in the direct connecting type of connector is avoided but a disadvantage is that the loss becomes large compared to the direct connecting type when an angular deflection of the optical fiber is generated, namely when the optical axes of two optical fibers to be connected are inclined with respect to each other.

SUMMARY OF THE INVENTION

It is a first object of this invention to provide a lens-applied optical fiber connector which allows only a very small connecting loss due to axial deflection and angular deflection.

It is a second object of this invention to provide a lens-applied optical fiber connector which is capable of compensating for axial deflection if it is generated.

It is a third object of this invention to provide a lens-applied optical fiber connector which protects a lens provided at the end of the sleeve and which prevents displacement of the lens.

It is a fourth object of this invention to provide a lens-applied optical fiber connector which does not result in wear at the time of insertion and removal.

It is a fifth object of this invention to provide a lens-applied optical fiber connector which improves the mechanical strength of the optical fiber connecting area with a simple structure.

DESCRIPTION OF THE PREFERRED EMBODIMENTS

Figure 1:
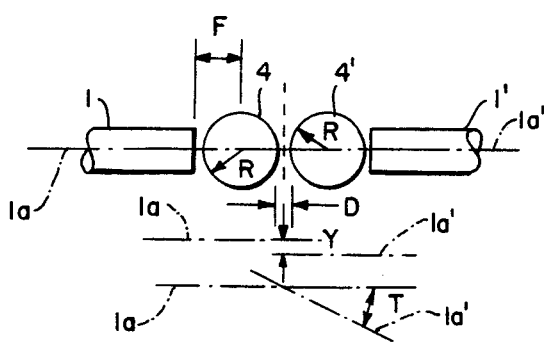
FIG. 1 schematically shows the lens-applied optical fiber connector of this invention.

In order to make the connecting loss due to an angular deflection and axial deflection of the lens-applied optical fiber connector small, the connecting loss for the focal distance of a spherical lens is first measured. For the measurement, an optical fiber and spherical lens are arranged as shown in FIG. 1. In particular, as shown in FIG. 1, two spherical lenses 4, 4' are arranged respectively face to face with the end surface of the optical fibers 1, 1' to be connected placed a distance from these lenses equal to the focal length F so that the optical axes 1a, 1a' of the optical fibers match the center of these lenses.

The optical beam transmitted through the optical fiber 1 is diverged from the end of the optical fiber 1 into a parallel light beam by means of the spherical lens 4 and is then converged into the other optical fiber 1' by the other spherical lens 4'.

In such a structure, the influence of the refraction coefficient of material forming the spherical lenses on the loss has been investigated for various spherical lens diameters, prior to determination of the focal length of the spherical lenses. The results are shown in FIG. 2.

Figure 2:
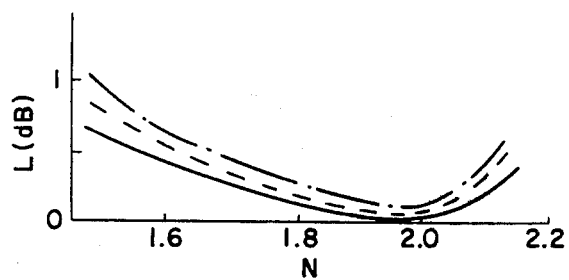
FIG. 2 shows the relationship between the refraction coefficient and the loss for three lens diameters.

In FIG. 2, the X axis represents the refraction coefficient N, while the Y axis represents a loss L(dB). The solid line corresponds to a spherical lens diameter of 125μ; the dotted line corresponds to a spherical lens diameter of 100μ; and the broken line (dash-and-point line) corresponds to a spherical lens diameter of 62.5μ.

For the measuring conditions, both the axial deflection and angular deflection are assumed to be zero, and anti-reflection film is formed on the spherical lens surface. Therefore, the characteristics indicated in FIG. 2 indicate a loss generated when the optical beam passes through the spherical lens.

As will be obvious from the figure, a loss is minimized for any diameter lens at a refraction coefficient from 1.95 to 2.0, and it is desirable to use a material having a refraction coefficient of 1.7 to 2.1 which will result in a loss of less than 0.5 dB since the loss due to the spherical lens should be as small as possible.

Based on the above results, various kinds of spherical lenses having different diameters have been formed using materials having refraction coefficients within the above range (glass, sapphire, gadolium gallium garnet etc.), and the influence on the axial deflection and angular deflection has the been investigated.

Figure 3:
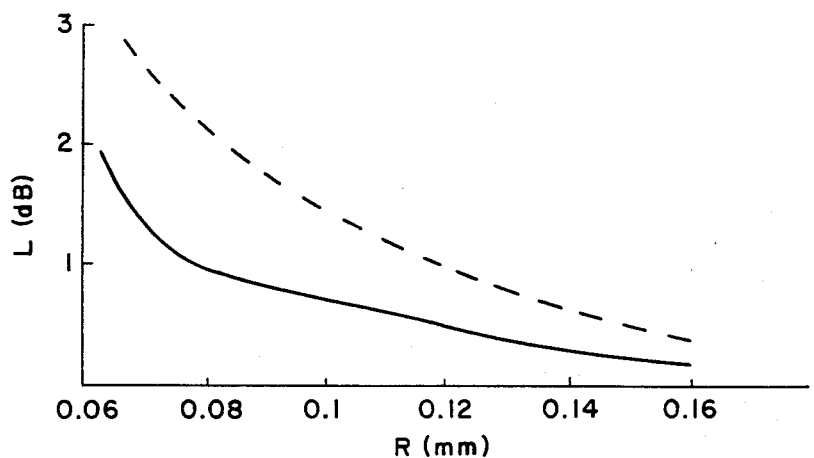
FIG. 3 shows the relationship between the radius of curvature of a spherical lens and the loss for two axial deflections.

FIG. 3 shows the experimental results for the optical axis deflection characteristic of optical fibers to be connected when the radius of curvature R of the spherical lens is changed. The X axis represents the radius of curvature of a spherical lens R (mm), while the Y axis represents a connecting loss L (dB). For the experiment, a spherical lens comprising glass having a refraction coefficient N of 1.75 is used and the axial deflection (indicated by Y in FIG. 1) is selected to be Y=4μm and Y=2.5μm. In addition, as the optical fiber, having a single mode optical fiber, having a core diameter a=4μm, a refraction coefficient Δ=0.3% and a normalized frequency V=2.37, is used.

In FIG. 3, the dotted line corresponds to the characteristic when Y=5 μm, while the solid line corresponds to the characteristic when Y=2.5 μm.

Figure 4:
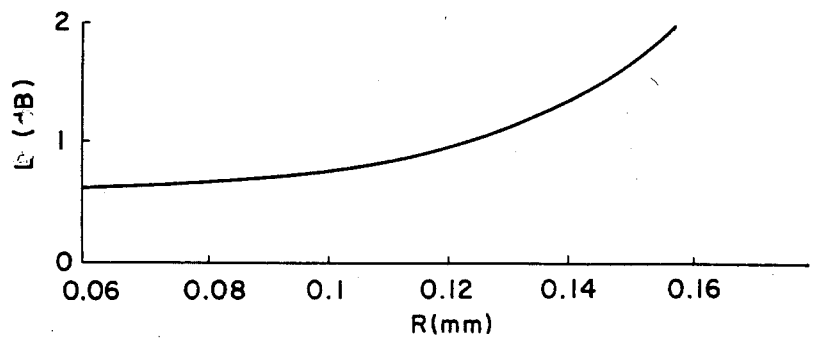
FIG. 4 and FIG. 5 show the relationship between the radius of curvature of a spherical lens and the loss for two angular deflections.
Figure 5:
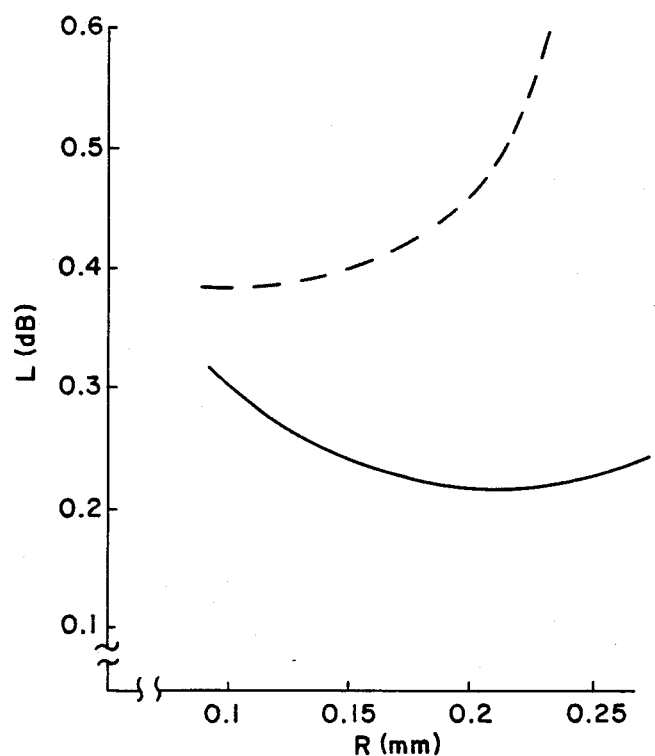

FIG. 4 and FIG. 5 respectively show the experimental results for the angular deflection characteristics (indicated by T in FIG. 1) of the optical fibers to be connected when the radius R of curvature of the spherical lens is changed. For the experiments, the spherical lens consists of glass having a refraction coefficient N of 1.75 and the angular deflection T is set to 1° (FIG. 4) and 0.25° (FIG. 5).

In FIG. 4, a single mode optical fiber is used as in the case of FIG. 3.

In FIG. 5, the dotted line corresponds to a single mode optical fiber having the following characteristics: a core diameter a of 3μ; a difference of refraction coefficient Δ of 0.63%; and a standardized frequency V of 2.23. On the other hand, the solid line corresponds to the following characteristic; a core diameter a of 4.3μ; a difference of refraction coefficient of 0.29%; and a standardized frequency V of 2.23.

The focal length of the spherical lens is determined from the above experimental results. From FIG. 3, R must be about 0.08 mm or more and from FIG. 4, R must be about 0.16 mm or less in order to keep the connecting loss at 2 dB (which does not have any influence on optical communication) or less. Since the focal length F of a lens is given by the relation, $F=NR/2(N-1)$, the focal length is selected to be a value within the range from 0.09 to 0.27 mm.

From the above, the optimum focal length of a spherical lens is obtained. Here, when it is required to make the connecting loss smaller, the compensation described below is necessary.

Figure 6:
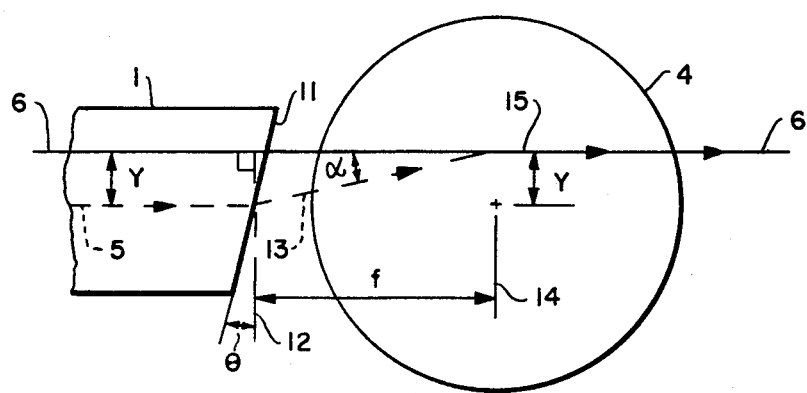
FIG. 6 and FIG. 7 show a structure for compensating for an axial deflection in accordance with the present invention.
Figure 9:
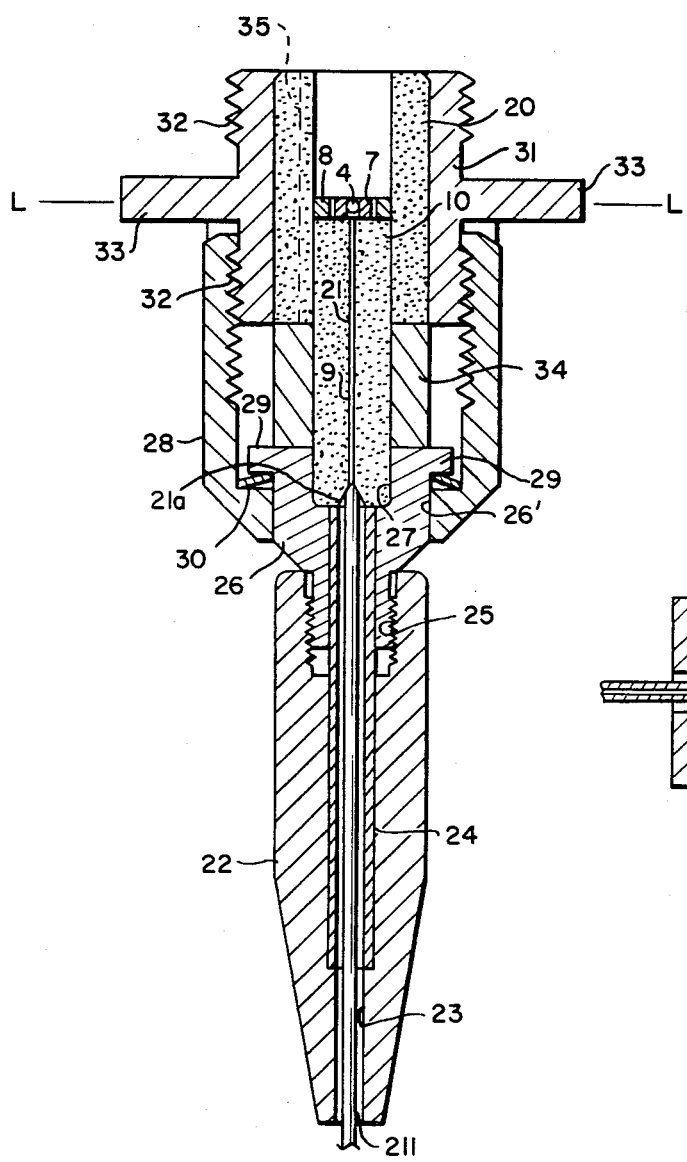
FIG. 9 shows the sleeve and adapter and the connection therebetween in accordance with the present invention.

Namely, in FIG. 6, it is assumed that the optical axis 5 of the optical fiber 1 is deflected by the distance Y to the optical axis 6 of the adapter 20 (FIG. 9). In addition, the end 11 of optical fiber 1 is polished so that it is inclined to the side of a spherical lens 4 to a degree so as to satisfy the following equation for the line 12 crossing orthogonally with the optical axis 6 of the adapter 20:

$$\theta = Y/f(n_0-1)$$

Where,
  f: Focal length of spherical lens 4
  $n_0$: Refraction coefficient of core of optical fiber 1

On the other hand, the center of spherical lens 4 is located on the extended line of the optical axis 5 of the optical fiber 1 at a distance from the center of end surface 11 of the optical fiber 1 equal to the focal length f of the spherical lens 4.

Figure 7:
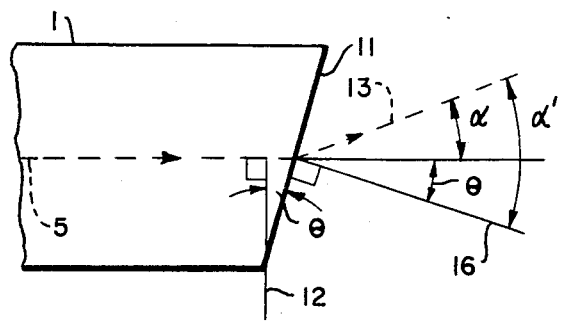

In such a structure, the optical beam emitted from the optical fiber 1 passes through the spherical lens 4 and is output onto the optical axis 6 of the adapter 20. The reason will be explained by making reference to FIG. 6 and FIG. 7. In FIG. 7, the light beam travelling on the optical axis 5 of the optical fiber 1 is emitted to the open air from the end surface 11 and travels in a particular direction. At this time, the angle formed by the direction of travel and a line 16 normal to the end surface 11 is assumed to be α'. Then, following relationship can be obtained from Fresnel's law.

$$n_{air}\sin\alpha' = n_0 \cdot \sin\theta$$

($n_{air}$ is the refraction coefficient of air)

Since both α' and θ are about 1° and are very small and $n_{air}$ is 1, $$\alpha' = n_0 \cdot \theta$$

On the other hand, when the opticl beam, having travelled on the optical axis 5 of optical fiber 1, advances in a particular direction 13 after it is emitted to the open air from the end surface 11, if an angle formed by the direction 13 and the optical axis 5 of the optical fiber 1 is assumed to be $$\alpha = \alpha' - \theta$$

then α' is substituted in the above equation and the following equation is obtained.

$$\alpha = n_0 \cdot \theta - \theta$$

From FIG. 6, on the other hand, $$Y = f \cdot \tan\alpha$$

Since α is also as small as about 1°, $$Y = f \cdot \alpha$$

Therefore, following equations can be obtained by substituting the above equation for α.

$$Y = f \cdot (n_0 \cdot \theta - \theta)$$

$$\therefore \theta = Y/f \cdot (n_0 - 1)$$

Thus, the optical beam emitted from the optical fiber 1 passes the point deflected by a distance Y from the center of the spherical lens 4 when it passes the surface 14 (the reference surface of the spherical lens 4) which orthogonally crosses the optical axis 6 of the adapter 20 and simultaneously passes the center of spherical lens 4. Since this point is the intersection of the reference surface 14 of the spherical lens 4 and the optical axis 6 of the adapter 20, the optical beam travels on the optical axis 6 of the adapter 20 after having passed through the spherical lens 4.

When the other spherical lens 4' and the other optical fiber 1' in FIG. 1 are structured as in the case above, the optical beam having been emitted and having travelled along the optical axis 6 of adapter 20 travels into the optical axis 1a' of the other optical fiber 1'.

As explained above, if the optical axes of the fibers 1, 1' are deflected, the optical beam can be relayed between the optical fibers on the optical axis, only by polishing the end surface 11 and establishing the positional relation with the spherical lenses 4, 4' as explained above.

Here, it is assumed that the center of the lens 4 is located at the area on the extended line of the optical axis of the optical fibers for the compensation explained in FIG. 6 and FIG. 7. If the lenses 4 and 4' are directly coming into contact when a sleeve 10 is inserted into the adapter 20 (FIG. 9), a discrepancy such as displacement or damage may occur.

Figure 8:
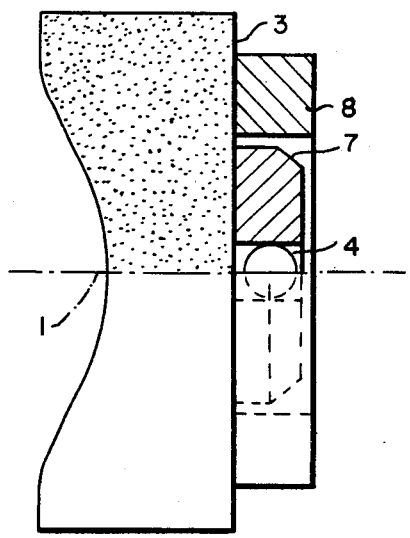
FIG. 8 shows a spherical lens holding structure in accordance with the present invention.

The lens holding structure, as illustrated in FIG. 8, has been invented to overcome the above-mentioned disadvantage and is explained below. In FIG. 8, 7 represents a lens holder and 8 a guard ring. Elements shown in FIG. 1 are given the same numbering as FIG. 1.

The optical fiber 1 is arranged on the center axis of a cylindrical sleeve 3, providing the spherical lens 4 at the end. This spherical lens 4 is held at its circumference by the lens holder 7 which is thicker than the spherical lens 4. The lens holder 7 is provided with the guard ring 8 which is thicker than the lens holder 7 by the thickness d on the plug end surface at the circumference. The lens holder 7 and guard ring 8 are bonded on the end surface of the sleeve 3 by a suitable bonding agent.

In such a structure, the spherical lens 4 can be provided on the end surface 11 of the optical fiber 1 by bonding the lens holder 7 which holds the spherical lens 4 to the end surface of the sleeve 3 and the center of spherical lens 4 can by easily matched to the optical axis 5 of the optical fiber 1.

When a pair of sleeves 3 are placed face to face in the adapter 20, the spherical lens 4 is protected by the lens holder 7 which is thicker than the lens 4 and the lens 4 is also protected from damage due to direct contact between the sleeves because it is protected by the guard ring 8 which is thicker than the lens holder 7. Moreover, since the lens holders which directly hold the lenses 4 and 4' do not come into contact, no force is applied on the lens holder 7 so that the lens holder 7 is not displaced even after a long period of use. It is desirable that the contact area of guard ring 8 should be comparatively large in order to make any influence by the sleeve 3 small by distributing the stress applied to the sleeve 3 when it is arranged face to face and the guard rings come into direct contact. Moreover, the guard ring 8 and lens holder 7 should be separately attached to the sleeve 3 so that stress on the guard ring 8 is not transmitted to the lens holder 7.

Next, the sleeve 3 and adapter 20 will be discussed. These are generally made of stainless steel and are mechanically bored to provide a hole having accuracy on the order of several tenths micron. It is almost impossible to bore a comparatively long hole (for example 10 mm).

However, if the optical fiber 1 is not supported for a certain length, the optical fiber 1 generates a microbending and can not be used because its straightness is not assured. To solve this problem, an optical fiber connector using, as the support, a jewel such a sapphire has been proposed. The boring techniques for jewels are already established in the field of watches and it is possible to bore a hole having an accuracy of several tenths micron. But in this case, the boring is also carried out mechanically and a support of the specified length is inevitably made by piling several plate sapphires each of which is split in the longitudinal direction. Thus, the structure is complicated and the manufacturing cost is increased so that such a method is not satisfactory.

The present invention has overcome the above-mentioned disadvantages of the prior art. According to the present invention, the sleeve 3 is formed by sintered material such as $Al_2O_3$ etc.

The preferred embodiment of the present invention is explained in detail with reference to FIG. 9.

The optical fiber connector of the present invention provides a sleeve 10 comprising sintered material for supporting an optical fiber (or optical fiber element line in more accurately) 9 and the adapter 20 in which the sleeve 10 is mounted. The sleeve 10 has a fine axial hole 21 having a diameter of 0.125 mm, for example, at the center, in which the optical fiber 9 of the same diameter is inserted by the press-in method. In the case of the present invention, since sleeve 10 is formed with the $Al_2O_3$ (including 99% ceramics, 96% ceramics or so-called 100% ceramics (including MgO . . . 0.25 wt %, $Cr_2O_3$ . . . 0.025 wt %)), the axial hole 21 can be bored by a laser beam. In particular, a hole having accuracy on the order of several tenths micron can be bored, as is well known, without any difficulty by means of a laser beam. Moreover, laser beam boring does not require that the length of sleeve 10 be limited and therefore sleeves having a length of 10 mm, for example, can be formed as an individual unit using the sintered material. The inlet end 21a of the axial hole 21 should desirably be chamfered as shown in the figure, making it easy to insert the optical fiber 9 into the axial hole 21.

A nylon protection layer 211 is inserted and bonded into a stainless pipe 24, for example, and is also inserted and bonded into the center hole 23 of a holder 22 which is formed, for example, of Al. The upper end of holder 22 is provided with threaded hole 25 and the stainless flush material 26 is threaded therein. Thus, the sleeve 10 is pushed into the U-shaped area 27 at the upper end of the flush material 26. The fiber element line 9 is peeled from the nylon protection layer 211, and is exposed at the bottom of the U-shaped area 27 of the stainless flush material 26. To a circumference of the flush material 26, the nut material 28 having a threaded hole is fitted. A flush spring 30 is arranged between the nut material 28 and the flange 29 of the flush material 26. The upper end of the nut material 28 is screwed into the threaded part 32 at a circumference of the connector 31 having a stainless steel flange 33. The flange 33 of the connector 31 is useful, for example, as the fitting part for mounting the connector to the other unit or as a handle for carrying it manually.

The adapter 20 is also formed of sintered material as in the case of sleeve 10. The adapter 20 may be of an ordinary cylindrical chape and it is settled into the internal bore of the connector 31. The connector 31 is symmetrical about the line L—L, and although it is not illustrated, a similar shaped structure for the other optical fiber to be connected is connected symmetrically at the upper half of the connector 31. At the both ends of the adapter 20, a spring sleeve 34 is formed, for example, of silicon rubber and is arranged between the adapter 20 and the flush material 26. The sleeve 34 engages the circumference of the sleeve 10.

In the preferred embodiment, at least one air-escape groove 35 is formed in the axial direction at the internal circumference of the adapter 20. The provision of the air-escape groove 35 brings about following effects. Namely, in the condition as shown in FIG. 9, when a second optical fiber (not shown) to be connected is inserted into the adapter 20 from the top of FIG. 9 together with its associated sleeve, the sleeve acts as if it were a piston. That is, it cannot be pushed down easily due to the compressed air between both sleeves. However, when the air-escape groove 35 is provided, the compressed air can escape through the air-escape groove 35 from the upper end. Thus, the sleeves can be pressed together smoothly. It would also be possible to provide an air-escape groove on the inside surface of the connector 31 in the radial direction. However, this is not desirable because foreign matter such as water or dust may easily come into contact with the surface of the sleeve 10. The air-escape groove 35 contributes to the improvement of the air-tightness of the optical fiber connector of this invention. Although it is not illustrated, it can be understood that exactly the same effect can be obtained by providing the air-escape groove 35 in the circumference of the sleeve 10 in place of the internal circumference of the adapter 20.

According to this invention the spring sleeve 34 and flush spring 30 can absorb the force applied in the axial direction on the lower sleeve 10 when the second optional fiber (not shown) is inserted together with its associated sleeve (not shown), for example, from the top of FIG. 9 into the adapter 20 and is pressed down to the lower sleeve 10. Therefore, when the force is removed, both sleeves are pressed face to face with each other because of the bias force of spring sleeve 34 and flush spring 30 whereby, the optical fibers can maintain the close contact condition.

In the present invention, moreover, since both the adapter 20 and sleeve 10 are formed of Al$_2$O$_3$ or its equivalent, no friction powder due to friction between the sleeve 10 and the adapter 20 is generated even when the sleeve 10 is inserted or removed. Thus a large insertion force is not required and the external surfaces of the sleeve 10 and the adapter 20 will not be damaged. This is because Al$_2$O$_3$ has a hardness which is close to that of a diamond and is notably superior to a stainless sleeve.

In practice, the axial hole of specified diameter of the sleeve 10 may be formed by first boring a hole slightly smaller than the specified diameter by means of a laser beam and then enlarging the hole to the specified diameter through marked lapping using, for example, diamond powder and tungsten wire. In this case, since the sleeve 10 is much harder than the adapter 20, the possibility of center deflection and destruction at the surface during the axial hole boring is much smaller than for stainless steel. As a result, very excellent surface accuracy of the fiber sleeve 10 and centering of the axial hole 21 can be assured. Also, the straightness at the optical fiber joint is also improved.

Moreover, the thermal expansion coefficient of Al$_2$O$_3$ is quite similar to that of the quartz which is used for forming the clad of optical fiber 9, thus resulting in a small amount of deformation by thermal change and a satisfactory temperature characteristic.

Finally, the adapter 20 and sleeve 10 of this invention can be formed with alumina sintered material which can be put into mass-production at a low cost and, as a result the manufacturing cost of the connector as a whole can be reduced drastically.

The structure shown in FIG. 9 illustrates another feature of this invention. Namely, it is required that the optical connector accurately match the optical axes of the optical fibers and to prevent any change in the connecting condition of the fibers due to an external force applied on the portion of the fibers extending outside of the connector.

Figure 10:
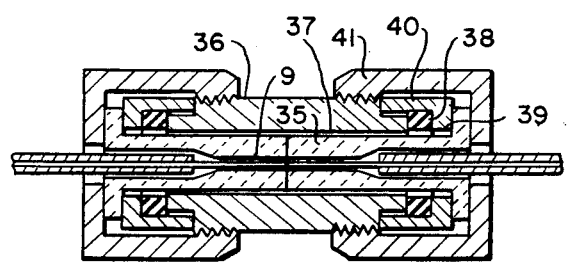
FIG. 10 shows an existing lens-applied optical fiber connector.

In order to attain such an object, one connector has the structure shown in FIG. 10. Namely, the optical fiber 9 is inserted first into the sleeve 35, and a first fitting 37 is formed between the sleeve 35 and the adapter 36, through which the sleeve 35 is inserted.

In order to connect the sleeve 35 and adapter 36, they are tightened a cap nut 41, so that a core 40 forms a second fitting 39 allowing a little larger clearance than that of the first fitting 37. An O-ring 38 acts as a cushion between the core 40 and the adapter 36.

According to this structure, the first fitting 37 assures accurate matching of the optical fiber axes, while the second fitting 39 mechanically protects the first fitting 37.

However, the additional use of the core 40 makes the connector expensive and the necessity of sequential insertions into the core 40 and adapter 36 at the time of inserting the sleeve 35 into the adapter gives rise to a problem of awkward insertion.

Therefore, in the present invention, the second fitting 39 is formed at the fitting part 26' of the cap nut 28 and the flush material 26 as shown in FIG. 9. Thus makes it possible to remove the core 40 and eliminate the disadvantages of the prior art.

As is obvious from the above explanation, in the case of the present invention, the use of a lens having adequate focal length assures accurate connection with only a simple structure. In addition, the possibility of compensation for the deflection of optical axes has alleviated the dimensional accuracy required by each part.

What is claimed is:

1. A lens-applied optical fiber connector for connecting first and second optical fibers, comprising:
    first and second cylindrical sleeves, each having a hole along its central axis through which the first and second optical fibers, respectively, are inserted;
    a hollow cylindrical adapter having a through hole through which said fist and second cylindrical sleeves are inserted from opposie sides;
    first and second lenses arranged between the first ends of said first and second cylindrical sleeves so as to be placed face to face in the through hole of said hollow cylindrical adapter, the first and second optical fibers optically connected via said first and second lenses;

first and second lens holders having first and second apertures for holding said first and second lenses respectively, said first and second lens holders thicker than said first and second lenses, said first and second lens holders connected to the first ends of said first and second cylindrical sleeves, said first and second lens holders having first and second maximum outer diameters which are less than the outer diameters of said first and second cylindrical sleeves, respectively; and first and second guard means for protecting said first and second lens holders, respectively, said first and second guard means thicker than said first and second lens holders, said first and second guard means connected to the first ends of said first and second cylindrical sleeves, said first and second guard means having first and second apertures which have first and second minimum diameters greater than the first and second maximum outer diameters of said first and second lens holders, respectively, said first and second guard means havng first and second maximum outer diameters which are less than or equal to the outer diameters of said first and second cylindrical sleeves, respectively.

2. A lens-applied optical fiber connector as set forth in claim 1, wherein said first and second lenses are spherical lenses having a focal length of from 0.09 to 0.27 mm and wherein said first and second lenses are positioned at a point on the optical axis of the first and second optical fibers equal to the focal length.

3. A lens-applied optical fiber connector as set forth in claim 2, wherein the end surface of each of the first and second optical fibers is shaped with a gradient angle defined by the angle of $$Y/f(n_0-1)$$

where, Y is the axial deflection between the optical axis of the first and second optical fibers and the center line of said hollow cylindrical adapter, f is the focal length of each of said first and second spherical lenses and $n_0$ is the refraction coefficient of the first and second optical fibers.

4. A lens-applied optical fiber connector as set forth in claim 1, wherein each of said first and second cylindrical sleeves is formed by a sintered material comprising mainly alumina.

5. A lens-applied optical fiber connector as set forth in claim 1, further comprising first and second elastic sleeves mounted to said first and second cylindrical sleeves.

6. A lens-applied optical fiber connector as set forth in claim 1, further comprising an air-escape groove formed in said hollow cylindrical adapter.

7. A lens-applied optical fiber connector as set forth in claim 1, further comprising:

first and second flush materials partially surrounding said first and second cylindrical sleeves, respectively; and first and second cap nuts for coupling said first and second flush materials, respectively, to said hollow cylindrical adapter.

8. A lens-applied optical fiber connector as set forth in claim 7, wherein the clearance between said first cap nut and said first flush material is greater than the clearance between said first cylindrical sleeve and said hollow cylindrical adapter.

9. A lens-applied optical fiber connector for connecting first and second optical fibers, comprising:

a hollow cylindrical adapter;

first and second fiber holding means inserted in opposite ends of said hollow cylindrical adapter, each of said first and second fiber holding means comprising:

a cylindrical sleeve having a hole along its central axis for receiving one of the first and second optical fibers;

a lens holder attached to an end of said cylindrical sleeve, said lens holder having an aperture and having a maximum outer diameter less than the outer diameter of said cylindrical sleeve;

a spherical lens held in said lens holder, said lens holder thicker than said spherical lens; and a guard ring mounted on the end of said cylindrical sleeve so as to protect said lens holder, said guard ring having a thickness which is greater than that of said lens holder, said guard ring having an aperture, within which said lens holder is positioned, having a minimum diameter greater than the maximum outer diameter of said lens holder, said guard ring having a maximum outer diameter less than or equal to the outer diameter of said cylindrical sleeve.

10. A lens-applied optical fiber connector as set forth in claim 9, further comprising first and second flush materials partially surrounding said cylindrical sleeve of said first and second fiber holding means, respectively; and first and second cap nuts for coupling said first and second flush materials, respectively, to said hollow cylindrical adapter.

11. A lens-applied optical fiber connector as set forth in claim 10, wherein said cylindrical sleeve of each of said first and second fiber holding means is formed by a sintered material comprising primarily alumina.

12. A lens-applied optical fiber connector as set forth in claim 11, wherein said hollow cylindrical adapter has an air escape groove.

13. A lens-applied optical fiber connector for connecting first and second optical fibers, comprising:

first and second cylindrical sleeves, each having a hole along its central axis through which the first and second optical fibers, respectively, are inserted;

a hollow cylindrical adapter having a through hole through which said first and second cylindrical sleeves are inserted from opposite sides;

first and second lenses arranged between the first ends of said first and second cylindrical sleeves so as to be placed face to face in the through hole of said hollow cylindrical adapter, the first and second optical fibers optically connected via said first and second lenses, said first and second lenses being spherical lenses having a focal length of from 0.09 to 0.27 mm, said first and second lenses positioned at a point on the optical axis of the first and second optical fibers equal to the focal length, the end surface of each of the first and second optical fibers being shaped with a gradient angle defined by the angle of $$Y/f(n_0-1)$$

where, Y is the axial deflection between the optical axis of the first and second optical fibers and the center line of said hollow cylindrical adapter, f is the focal length of each of said first and second spherical lenses and $n_0$ is the refraction coefficient of the first and second optical fibers;

first and second lens holders for holding said first and second lenses, respectively, said first and second lens holders thicker than said first and second lenses; and first and second guard means for protecting said first and second lens holders, respectively, said first and second guard means thicker than said first and second lens holders, said first and second guard means connected to the first ends of said first and second cylindrical sleeves.

* * * * *

UNITED STATES PATENT AND TRADEMARK OFFICE
CERTIFICATE OF CORRECTION

PATENT NO. : 4,371,233

DATED : FEBRUARY 1, 1983

INVENTOR(S) : SIGEFUMI MASUDA

It is certified that error appears in the above-identified patent and that said Letters Patent is hereby corrected as shown below:

```
Col. 1, line 65, "accurancy" should be --accuracy--.
Col. 3, line 29, "the" should be --then--;
        line 38, "4" should be --5--;
        line 39, delete "having".
Col. 5, line 19, "into" should be --onto--.
Col. 6, line 61, delete ",";
        line 63, "a" should be --the--;
        line 64, "the" should be --a--;
        line 68, "a" (first occurrence) should be --the--;
                 and "the" should be --a--.
Col. 7, line 3, after "connector" insert --31--;
        line 7, "chape" should be --shape--;
        line 45, "tional" should be --tical--;
        line 51, "30 whereby," should be --30, whereby--;
        line 57, after "Thus" insert --,--.
Col. 8, line 30, after "tightened" insert --with--.
Col. 9, line 4, after "lenses" insert --,--.
Col. 12, line 7, "ends" should be --end--.
```

Signed and Sealed this

Thirtieth Day of August 1983

[SEAL]

Attest:

GERALD J. MOSSINGHOFF

Attesting Officer

Commissioner of Patents and Trademarks